(12) United States Patent
McKenney

(10) Patent No.: US 8,997,110 B2
(45) Date of Patent: *Mar. 31, 2015

(54) RESOLVING RCU-SCHEDULER DEADLOCKS

(71) Applicant: International Business Machines Corporation, Armonk, NY (US)

(72) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/093,441

(22) Filed: Nov. 30, 2013

(65) Prior Publication Data

US 2014/0089939 A1    Mar. 27, 2014

Related U.S. Application Data

(63) Continuation of application No. 13/475,003, filed on May 18, 2012.

(51) Int. Cl.
G06F 9/46    (2006.01)
G06F 9/00    (2006.01)
G06F 9/48    (2006.01)
G06F 9/52    (2006.01)

(52) U.S. Cl.
CPC ............ *G06F 9/4881* (2013.01); *G06F 9/524* (2013.01)
USPC ............ 718/107; 718/102; 712/220; 712/245

(58) Field of Classification Search
None
See application file for complete search history.

(56) References Cited

U.S. PATENT DOCUMENTS

| 5,442,758 A | 8/1995 | Slingwine et al. |
| 5,608,893 A | 3/1997 | Slingwine et al. |
| 5,727,209 A | 3/1998 | Slingwine et al. |
| 6,219,690 B1 | 4/2001 | Slingwine et al. |
| 6,662,184 B1 | 12/2003 | Friedberg |
| 6,886,162 B1 | 4/2005 | McKenney |
| 6,996,812 B2 | 2/2006 | McKenney |

(Continued)

OTHER PUBLICATIONS

J. Seigh, "RCU + SMR for preemptive kernel/user threads," Linux Kernel Mailing List, May 9, 2005, 2 pages.

(Continued)

*Primary Examiner* — Mengyao Zhe
*Assistant Examiner* — Bing Zhao
(74) *Attorney, Agent, or Firm* — Walter W. Duft

(57) ABSTRACT

A technique for resolving deadlocks between an RCU subsystem and an operating system scheduler. An RCU reader manipulates a counter when entering and exiting an RCU read-side critical section. At the entry, the counter is incremented. At the exit, the counter is manipulated differently depending on the counter value. A first counter manipulation path is taken when the counter indicates a task-context RCU reader is exiting an outermost RCU read-side critical section. This path includes condition-based processing that may result in invocation of the operating system scheduler. The first path further includes a deadlock protection operation that manipulates the counter to prevent an intervening RCU reader from taking the same path. The second manipulation path is taken when the counter value indicates a task-context RCU reader is exiting a non-outermost RCU read-side critical section, or an RCU reader is nested within the first path. This path bypasses the condition-based processing.

5 Claims, 8 Drawing Sheets

```
1  void __rcu_read_unlock(void)
2  {
3    struct task_struct *t = current;
4
5    if (t->rcu_read_lock_nesting != 1) {
6      --t->rcu_read_lock_nesting;
7    } else {
8      barrier(); /*critical section before exit code*/
9      t->rcu_read_lock_nesting = INT_MIN;
10     /*assign before ->rcu_read_unlock_special load*/
11     barrier();
12     if (unlikely(ACCESS_ONCE(t->rcu_read_unlock_special)))
13       rcu_read_unlock_special(t);
14     barrier(); /*->rcu_read_unlock_special load before assign*/
15     t->rcu_read_lock_nesting == 0;
16   }
17 }
```

(56) References Cited

U.S. PATENT DOCUMENTS

| | | | |
|---|---|---|---|
| 7,191,272 B2 | 3/2007 | McKenney | |
| 7,287,135 B2 | 10/2007 | McKenney et al. | |
| 7,349,926 B2 | 3/2008 | McKenney et al. | |
| 7,353,346 B2 | 4/2008 | McKenney et al. | |
| 7,395,263 B2 | 7/2008 | McKenney | |
| 7,395,383 B2 | 7/2008 | McKenney | |
| 7,426,511 B2 | 9/2008 | McKenney | |
| 7,454,581 B2 | 11/2008 | McKenney et al. | |
| 7,472,228 B2 | 12/2008 | McKenney et al. | |
| 7,653,791 B2 | 1/2010 | McKenney | |
| 7,668,851 B2 | 2/2010 | Triplett | |
| 7,689,789 B2 | 3/2010 | McKenney et al. | |
| 7,734,879 B2 | 6/2010 | McKenney et al. | |
| 7,734,881 B2 | 6/2010 | McKenney et al. | |
| 7,747,805 B2 | 6/2010 | McKenney | |
| 7,814,082 B2 | 10/2010 | McKenney | |
| 7,818,306 B2 | 10/2010 | McKenney et al. | |
| 7,873,612 B2 | 1/2011 | McKenney et al. | |
| 7,904,436 B2 | 3/2011 | McKenney | |
| 7,934,062 B2 | 4/2011 | McKenney et al. | |
| 7,953,708 B2 | 5/2011 | McKenney et al. | |
| 7,953,778 B2 | 5/2011 | McKenney et al. | |
| 7,987,166 B2 | 7/2011 | McKenney et al. | |
| 8,020,160 B2 | 9/2011 | McKenney | |
| 8,055,860 B2 | 11/2011 | McKenney et al. | |
| 8,055,918 B2 | 11/2011 | McKenney et al. | |
| 8,108,696 B2 | 1/2012 | Triplett | |
| 8,126,843 B2 | 2/2012 | McKenney et al. | |
| 8,176,489 B2 | 5/2012 | Bauer et al. | |
| 2006/0112121 A1 | 5/2006 | McKenney et al. | |
| 2006/0136503 A1* | 6/2006 | Elmendorf et al. | 707/200 |
| 2006/0265373 A1 | 11/2006 | McKenney et al. | |
| 2008/0082532 A1 | 4/2008 | McKenney | |
| 2008/0313238 A1 | 12/2008 | McKenney et al. | |
| 2009/0006403 A1 | 1/2009 | McKenney | |
| 2009/0077080 A1 | 3/2009 | McKenney | |
| 2009/0320030 A1 | 12/2009 | Ogasawara | |
| 2010/0115235 A1 | 5/2010 | Triplett | |
| 2011/0055183 A1 | 3/2011 | McKenney | |
| 2011/0055630 A1 | 3/2011 | McKenney et al. | |
| 2011/0137962 A1 | 6/2011 | McKenney et al. | |
| 2011/0283082 A1 | 11/2011 | McKenney et al. | |

OTHER PUBLICATIONS

M. Michael, "Hazard Pointers: Safe Memory Reclamation for Lock-Free Objects," IEEE Transactions on Parallel and Distributed Systems, Jun. 2004, vol. 15, No. 6, pp. 491-504.
D. Sarma et al., "Making RCU Safe for Deep Sub-Millisecond Response Realtime Applications," 2004 USENIX (UseLinux track) Jun. 2004, 9 pages.
P. McKenney, "RCU vs. Locking Performance on Different CPUs," 2004 Linux.conf.au, 2004, 18 pages.
P. McKenney et al., "Scaling dcache with RCU," Linux Journal, Jan. 1, 2004, 12 pages.
P. McKenney et al., "Using RCU in the Linux 2.5 Kernel," Linux Journal, Oct. 1, 2003, 11 pages.
P. McKenney et al.,"Read-Copy Update," 2002 Ottawa Linux Symposium, Jul. 8, 2002, 32 pages.
H. Lindar et al., "Scalability of the Directory Entry Cache," 2002 Ottawa Linux Symposium, Jun. 26, 2002, pp. 289-300.
P. McKenney et al., "Read-Copy Update," 2001 Ottawa Linux symposium, Jul. 2001, 22 pages.
P. McKenney et al., "Read-Copy Update: Using Execution History to Solve Concurrency Problems," PDCS, Oct. 1998, 11 pages.
S. Dietrich et al., "Evolution of Real-Time Linux," 7th RTL Workshop, Nov. 17, 2005, 18 pages.
B. Gamsa, "Tornado: Maximizing Locality and Concurrency in a Shared Memory Multiprocessor Operating System," 1999, 14 pages.
Molnar et al., "Realtime and Linux," 2005 Linux Kernel Summit, 8 pages.
H. Boehm, "The Space Cost of Lazy Reference Counting," ACM SIGPLAN Notices, Proceedings of the 31st ACM SIGPLAN-SIGACT Symposium on Principles of Programming Languages, POPL '04, vol. 39, Issue 1, Jan. 2004, p. 210-219.
M. Michael, "Scalable Lock-Free Dynamic Memory Allocation," ACM SIGPLAN Notices, Proceedings of the ACM SIGPLAN 2004 Conference on Programming Language Design and Implementation; PLDI '04, vol. 39, Issue 6, Jun. 2004, p. 35-46.
D. Dice et al., "Mostly Lock-Free Malloc," ACM SIGPLAN Notices, Proceedings of the 3rd International Symposium on Memory Management, ISMM '02, vol. 38, Issue 2 Supplement, Jun. 2002, p. 163-174.
J. Corbet, "Read-copy-update for realtime," LWN.net, Sep. 26, 2006, 3 pages.
McKenney, "Seven real-time Linux approaches (Part C)", LinuxDevices.com, Jun. 7, 2005, 13 pages.
P. McKenney, "RCU and CONFIG_PREEMPT_RT progress," Linux Kernel Mailing List, May 9, 2005, 2 pages.
O. Nesterov, QRCU: 'Quick' SRCU Implementation, Linux Kernel Mailing List, Dec. 1, 2005, 3 pages.
P. McKenney, "Sleepable RCU", LWN.net, Oct. 9, 2006, 10 pages.
P. McKenney, "Read-Copy Update Implementations", 2001, 3 pages.
M. Herlihy, "A Methodology for Implementing Highly Concurrent Data Objects," ACM Transactions on Programming Languages and Systems, vol. 15, Issue 5, Nov. 1993, pp. 745-770.
M. Michael, "Safe Memory Reclamation for Dynamic Lock-Free Objects Using Atomic Reads and Writes," Proceedings of the 21st Annual ACM Symposium on Principles of Distributed Computing, Jul. 2002, 10 pages.
N. Barghouti et al., "Concurrency Control in Advanced Database Operations," Jan. 1994, 83 pages.
P. McKenney, "Exploiting Deferred Destruction: An Analysis of Read-Copy-Update Techniques in Operating System Kernels," OGI School of School of Science & Engineering at Oregon Health & Science University, Jul. 2004, pp. 1-380.
P. McKenney et al., "Extending RCU for Realtime and Embedded Workloads," 2006 Ottawa Linux Symposium, Aug. 11, 2006, 15 pages.
P. McKenney, "The design of preemptible read-copy-update," LWN.net, Oct. 8, 2007, 27 pages.
P. McKenney, "Integrating and Validating dynticks and Preemptible RCU," LWN.net, Apr. 22, 2008, 19 pages.
P. McKenney, "Hierarchical RCU," LWN.net, Nov. 4, 2008, 19 pages.
P. McKenney, "Is Parallel Programming Hard, and, If So, What Can You Do About It", Mar. 8, 2009, 146 pages.
P. McKenney, "Priority-Boosting RCU Read-Side Critical Sections," LWN.net, Feb. 5, 2007, 15 pages.
P. McKenney et al., "Towards hard realtime response from the Linux kernel on SMP hardware," linux.conf.au, Canberra, Australia, Apr. 2005, 16 pages.
P. McKenney et al., "Exploiting Deferred Destruction: An Analysis of Read-Copy-Update Techniques in Operating System Kernels", Jan. 3, 2005, pp. 1-41.
D. Guniguntala et al., "The read-copy-update mechanism for supporting real-time applications on shared-memory multiprocessor systems with Linux", IBM Systems Journal vol. 47 No. 2, 2008, pp. 221-236.
P. McKenney, "Introducing Technology Into Linux", 2008 Linux Developer Symposium, China, 2008, 47 pages.
P. McKenney, "Simplicity Through Optimization", linux.conf.au, Jan. 2010, 109 pages.
P. McKenney, "Deterministic Synchronization in Multicore Systems: the Role of RCU", Aug. 18, 2009, pp. 1-9.
P. McKenney, "RCU cleanups and simplified preemptable RCU", LKML.org, Jul. 23, 2009, 1 page.
P. McKenney, "Expedited "big hammer" RCU grace periods", LKML.org, Jun. 25, 2009, 2 pages.
P. McKenney, "RCU: The Bloatwatch Edition", LWN.net, Mar. 17, 2009, 9 pages.
M. Desnoyers, "Low-Impact Operating System Tracing", University of Montreal, PhD Thesis, Dec. 2009, 233 pages.
P. McKenney, "Using a Malicious User-Level RCU to Torture RCU-Based Algorithms", linux.conf.au, Jan. 2009, 51 pages.

(56) References Cited

OTHER PUBLICATIONS

P. McKenney et al., "Introducing Technology Into the Linux Kernel: A Case Study", Operating Systems Review, Jul. 2008, 16 pages.
P. McKenney, "What is RCU, Fundamentally", LWN.net, Dec. 17, 2007, 15 pages.
P. McKenney, What is RCU? Part 2: Usage, LWN.net, Dec. 24, 2007, 15 pages.
P. McKenney, RCU part 3: the RCU API, LWN.net, Jan. 7, 2008, 7 pages.
T. Hart et al., "Performance of memory reclamation for lockless synchronization", Journal of Parallel and Distributed Computing, Dec. 2007, pp. 1270-1285.
McKenney, "Using Promela and Spin to verify parallel algorithms", LWN.net, Aug. 1, 2007, 11 pages.
McKenney, "RCU and Unloadable Modules", LWN.net, Jan. 14, 2007, 4 pages.
P. Zijlstra, "[Patch] slab: document SLAB_DESTROY_BY_RCU", LKML.org, Nov. 13, 2008, 1 page.
A. Arcangeli et al., "Using Read-Copy-Update Techniques for System V IPC in the Linux 2.5 Kernel," 2003 FREENIX, Jun. 14, 2003, 13 pages.
P. McKenney, "The RCU API, 2010 Edition", LWN.net, Dec. 8, 2010, 11 pages.
M. Desnoyers et al., "User-Level Implementations of Read-Copy Update", IEEE Transactions on Parallel and Distributed Systems, vol. x, No. y, Jul. 2009, pp. 1-14.
J. Triplett, "Scalable Concurrent Hash Tables via Relativistic Programming", ACM-SIGOPS Operating System Review vol. 44, Issue 3, Jul. 2010, 14 pages.
T. Gleixner, High Resolution Timers / Dynamic Tics—V2, LWN.net, Oct. 31, 2006, 5 pages.
Rossbach et al., "TxLinux: Using and Managing Hardware Transactional Memory in an Operating System", SOSP ACM, Oct. 14-17, 2007, pp. 87-101.

* cited by examiner

```
1 void __rcu_read_unlock(void)
2 {
3   struct task_struct *t = current;
4
5   barrier();
6   if (--t->rcu_read_lock_nesting == 0) {
7     barrier();
8     if (unlikely(ACCESS_ONCE(t->rcu_read_unlock_special)))
9       rcu_read_unlock_special(t);
10  }
11 }
```

FIG. 8 (PRIOR ART)

```
1 void __rcu_read_unlock(void)
2  {
3   struct task_struct *t = current;
4
5    if (t->rcu_read_lock_nesting != 1) {
6       --t->rcu_read_lock_nesting;
7    } else {
8       barrier(); /*critical section before exit code*/
9       t->rcu_read_lock_nesting = INT_MIN;
10      /*assign before ->rcu_read_unlock_special load*/
11      barrier();
12      if (unlikely(ACCESS_ONCE(t->rcu_read_unlock_special)))
13        rcu_read_unlock_special(t);
14      barrier(); /*->rcu_read_unlock_special load before assign*/
15      t->rcu_read_lock_nesting == 0;
16     }
17 }
```

FIG. 9

RESOLVING RCU-SCHEDULER DEADLOCKS

This application is a continuation under 35 U.S.C. 120 of application Ser. No. 13/475,003, filed May 18, 2012, entitled "Resolving RCU-Scheduler Deadlocks."

BACKGROUND

1. Field

The present disclosure relates to computer systems and methods in which data resources are shared among data consumers while preserving data integrity and consistency relative to each consumer. More particularly, the disclosure concerns an implementation of a mutual exclusion mechanism known as "read-copy update" (also known as "RCU") in an operating system kernel environment wherein RCU uses the operating system scheduler and the scheduler uses RCU.

2. Description of the Prior Art

By way of background, read-copy update (also known as "RCU") is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to both uniprocessor and multiprocessor computing environments wherein the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of read operations that may have been referencing the data concurrently with the update. The other view is the new (post-update) data state that is seen by operations that access the data following the update. In the second (deferred update) phase, the old data state is removed following a "grace period" that is long enough to ensure that the first group of read operations will no longer maintain references to the pre-update data. The second-phase update operation typically comprises freeing a stale data element to reclaim its memory. In certain RCU implementations, the second-phase update operation may comprise something else, such as changing an operational state according to the first-phase update.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables. Moreover, the list itself is a type of data structure.

It is assumed that the data element list of FIGS. 1A-1D is traversed (without locking) by multiple readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring an appropriate lock (to exclude other updaters), allocating new memory for B', copying the contents of B to B', modifying B' as needed, updating the pointer from A to B so that it points to B', and releasing the lock. In current versions of the Linux® kernel, pointer updates performed by updaters can be implemented using the rcu_assign_pointer( ) primitive. As an alternative to locking during the update operation, other techniques such as non-blocking synchronization or a designated update thread could be used to serialize data updates. All subsequent (post update) readers that traverse the linked list, such as the reader r2, will see the effect of the update operation by encountering B' as they dereference B's pointer. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays. In current versions of the Linux® kernel, pointer dereferences performed by readers can be implemented using the rcu_dereference( ) primitive.

At some subsequent time following the update, r1 will have continued its traversal of the linked list and moved its reference off of B. In addition, there will be a time at which no other reader process is entitled to access B. It is at this point, representing an expiration of the grace period referred to above, that u1 can free B, as shown in FIG. 1D.

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following the expiration of a grace period.

In the context of the read-copy update mechanism, a grace period represents the point at which all running tasks (e.g., processes, threads or other work) having access to a data element guarded by read-copy update have passed through a "quiescent state" in which they can no longer maintain references to the data element, assert locks thereon, or make any assumptions about data element state. By convention, for operating system kernel code paths, a context switch, an idle loop, and user mode execution all represent quiescent states for any given CPU running non-preemptible code (as can other operations that will not be listed here). The reason for this is that a non-preemptible kernel will always complete a particular operation (e.g., servicing a system call while running in process context) prior to a context switch.

In FIG. 3, four tasks 0, 1, 2, and 3 running on four separate CPUs are shown to pass periodically through quiescent states (represented by the double vertical bars). The grace period (shown by the dotted vertical lines) encompasses the time frame in which all four tasks that began before the start of the grace period have passed through one quiescent state. If the four tasks 0, 1, 2, and 3 were reader tasks traversing the linked lists of FIGS. 1A-1D or FIGS. 2A-2C, none of these tasks having reference to the old data element B prior to the grace period could maintain a reference thereto following the grace period. All post grace period searches conducted by these tasks would bypass B by following the updated pointers created by the updater.

Grace periods may synchronous or asynchronous. According to the synchronous technique, an updater performs the first phase update operation, blocks (waits) until a grace period has completed, and then implements the second phase update operation, such as by removing stale data. According to the asynchronous technique, an updater performs the first phase update operation, specifies the second phase update operation as a callback, then resumes other processing with the knowledge that the callback will eventually be processed at the end of a grace period. Advantageously, callbacks requested by one or more updaters can be batched (e.g., on callback lists) and processed as a group at the end of an asynchronous grace period. This allows asynchronous grace period overhead to be amortized over plural deferred update operations.

In some RCU implementations designed for preemptible operating system kernels, asynchronous grace period processing is the norm but a synchronous expedited grace period, sometimes referred to as a "Big Hammer" grace period, is also available for updaters that need it. This expedited grace period forces a context switch (and thus a quiescent state) on each processor so that an updater can quickly perform its second-phase update operation. Existing callbacks associated with asynchronous grace periods are not affected. They must await the end of an asynchronous grace period before becoming ripe for processing. In other RCU implementations designed for preemptible operating system kernels, the RCU grace period mechanism includes the capability of priority boosting reader tasks that were preempted within their RCU read-side critical sections so that such tasks do not unduly delay the end of a grace period.

In the foregoing preemptible kernel-based RCU implementations, the RCU subsystem can invoke the operating system scheduler from the rcu_read_unlock( ) primitive, which is invoked by reader tasks when they exit their RCU read-side critical sections. The rcu_read_unlock( ) primitive is a companion to the rcu_read_lock( ) primitive, which is invoked by reader tasks when they enter their RCU read-side critical sections. Two scenarios in which the rcu_read_unlock( ) primitive will result in invocation of the operating system scheduler are (1) when RCU priority boosting is enabled and the reader task that invoked rcu_read_unlock( ) needs to be deboosted, and (2) when the reader task that invoked rcu_read_unlock( ) is the last reader holding up an RCU expedited grace period and the updater task that requested the expedited grace period needs to be awakened. These operations require the scheduler to acquire runqueue locks and priority inheritance locks.

However, some operating system schedulers, such as the scheduler in current versions of the Linux® kernel, can themselves implement RCU read-side critical sections. Applicant submits that there are scenarios in which such usage could cause deadlock problems if the scheduler invoked by a (non-scheduler) reader task itself invokes rcu_read_unlock( ) and attempts to obtain runqueue or priority-inheritance locks that it already holds. The present disclosure presents a solution that addresses this issue.

SUMMARY

A method, system and computer program product are provided for resolving deadlocks between an RCU subsystem and an operating system scheduler. According to an example embodiment, an RCU registration component of the RCU subsystem allows an RCU reader to manipulate an rcu_read_lock_nesting counter when the RCU reader enters an RCU read-side critical section. An RCU unregistration component of the RCU subsystem allows an RCU reader to manipulate the rcu_read_lock_nesting counter when the RCU reader leaves an RCU read-side critical section. The unregistration component provides first and second rcu_read_lock_nesting manipulation paths that are dependent on a current value of the rcu_read_lock_nesting counter. The first rcu_read_lock_nesting manipulation path is taken when the current value of the rcu_read_lock_nesting counter is indicative of a task-context RCU reader exiting an outermost RCU read-side critical section. It includes condition-based read-side helper processing that may result in invocation of the operating system scheduler. This path further includes a deadlock protection operation that temporarily manipulates the rcu_read_lock_nesting counter to prevent any intervening RCU reader from taking the first rcu_read_lock_nesting manipulation path while a task-context RCU reader is within that path. The second rcu_read_lock_nesting manipulation path is taken when the current value of the rcu_read_lock_nesting counter is indicative of a task-context RCU reader exiting a non-outermost RCU read-side critical section, or an RCU reader being nested within the first rcu_read_lock_nesting manipulation path (such as due to an interrupt handler interrupting the path to run the scheduler or an explicit call to the scheduler from within the path). This path bypasses the condition-based read-side helper processing.

According to an example embodiment, the RCU registration component allows an RCU reader to manipulate the rcu_read_lock_nesting counter by incrementing it. The RCU unregistration component allows an RCU reader to manipulate the rcu_read_lock_nesting counter by either decrementing it or setting it to a value, depending on which manipulation path is taken by the RCU reader. The first manipulation path may include setting the rcu_read_lock_nesting counter to a deadlock protection value, and the second manipulation path may include decrementing the rcu_read_lock_nesting counter.

More particularly, the first manipulation path may taken when the rcu_read_lock_nesting counter has a first count value that is indicative of the task-context RCU reader exiting all RCU read-side critical section processing, and may comprise setting the rcu_read_lock_nesting counter to an arbitrary second count value representing the deadlock protection value, performing the read-side helper processing, and setting the rcu_read_lock_nesting counter to a third count value that is indicative of the task-context RCU reader being outside of an RCU read-side critical section. The arbitrary second count value may be a large negative number.

The second manipulation path may be taken when the rcu_read_lock_nesting counter has any value other than the first count value, and may comprise decrementing the rcu_read_lock_nesting counter and bypassing the read-side helper processing.

BRIEF DESCRIPTION OF THE DRAWINGS

The foregoing and other features and advantages will be apparent from the following more particular description of example embodiments, as illustrated in the accompanying Drawings, in which:

FIG. 8 is a C language code listing showing conventional operations of a reader unregistration component of the RCU subsystem;

FIG. 9 is a C language code listing showing operations of an improved reader unregistration component of the RCU subsystem implemented in accordance with the present disclosure;

DETAILED DESCRIPTION OF EXAMPLE EMBODIMENTS

Figure 1A:
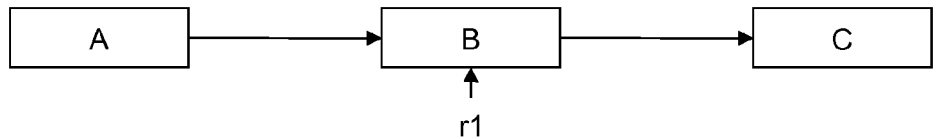
FIGS. 1A-1D are diagrammatic representations of a linked list of data elements undergoing a data element replacement according to a conventional read-copy update mechanism.
Figure 1B:
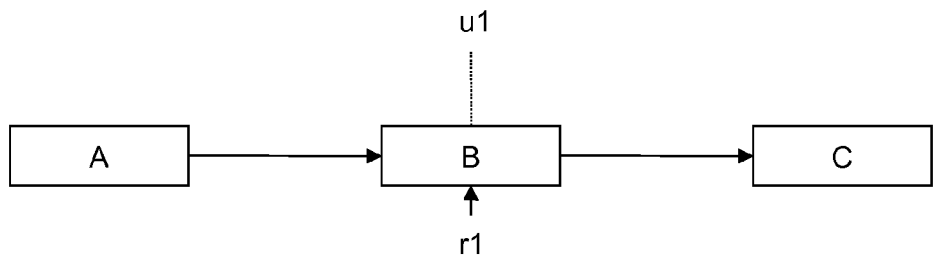
Figure 1C:
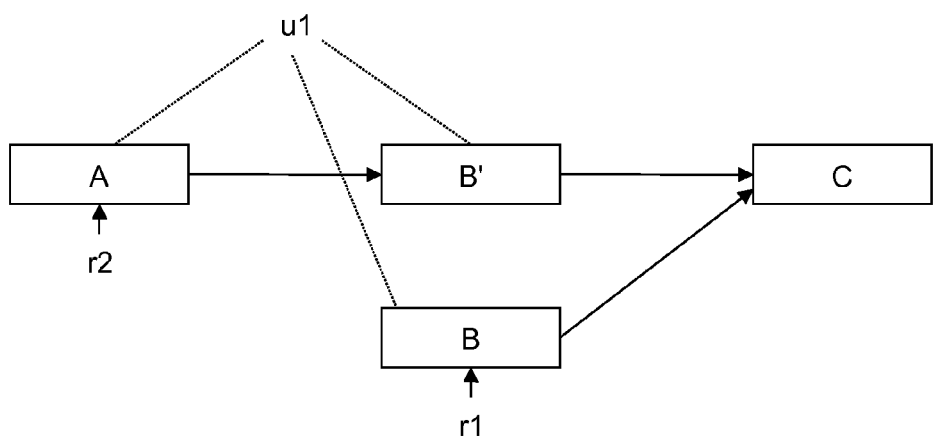
Figure 1D:
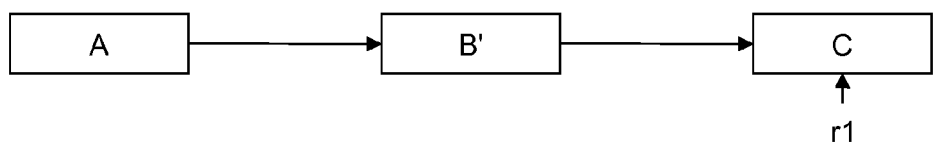
Figure 2A:
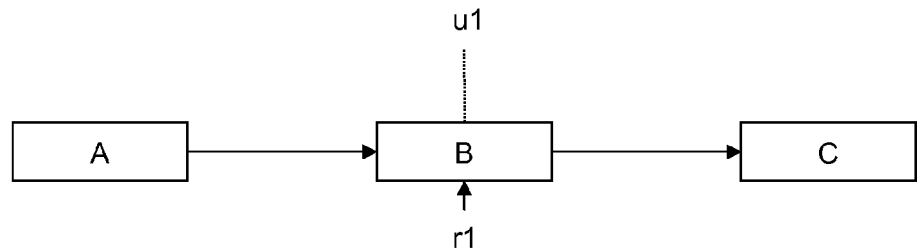
FIGS. 2A-2C are diagrammatic representations of a linked list of data elements undergoing a data element deletion according to a conventional read-copy update mechanism.
Figure 2B:
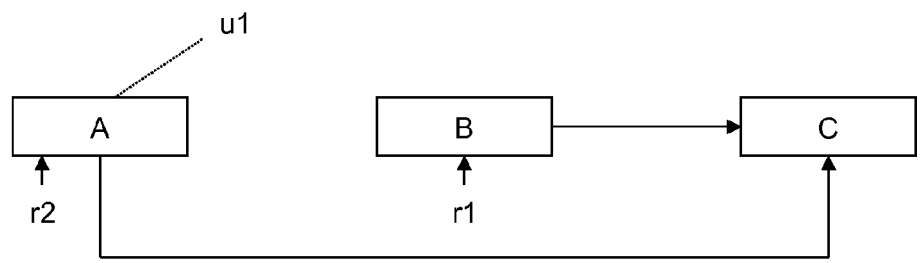
Figure 2C:
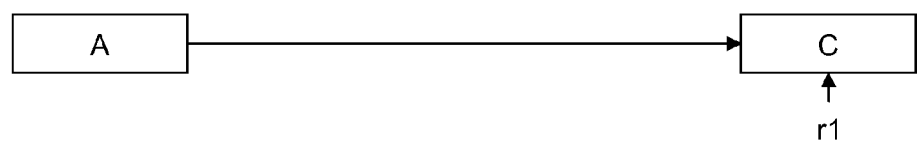
Figure 3:
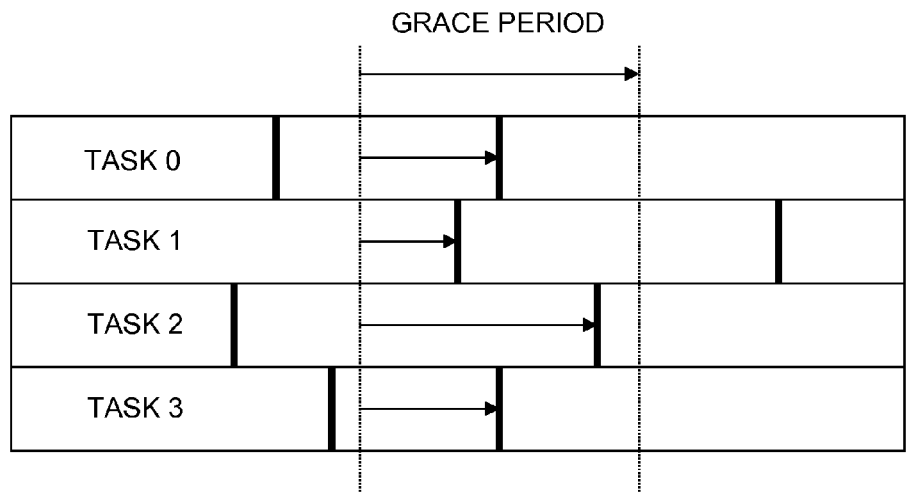
FIG. 3 is a flow diagram illustrating a grace period in which four processes pass through a quiescent state.
Figure 4:
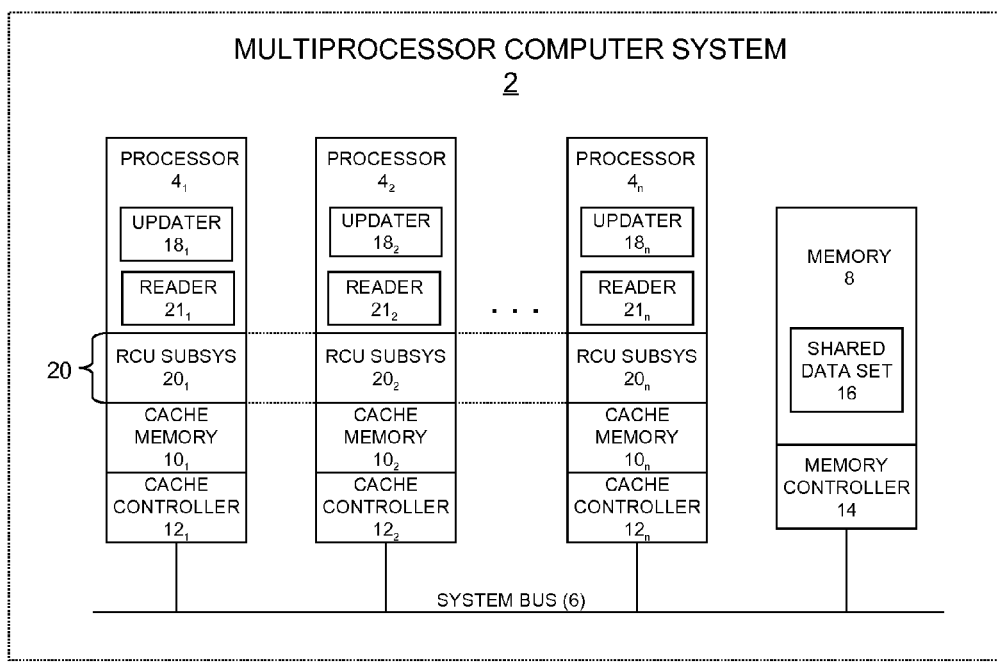
FIG. 4 is a functional block diagram showing a multiprocessor computer system that may be implemented in accordance with the present disclosure.

Turning now to the drawing FIG. 4 et seq., wherein like reference numerals represent like elements in all of the several views, FIG. 4 illustrates an example multiprocessor computer system 2 in which the subject matter disclosed herein may be implemented. By way of example only, the computer system 2 is shown as including multiple processors $4_1, 4_2 \ldots 4_n$, a system bus 6, and a program memory 8. There are also cache memories $10_1, 10_2 \ldots 10_n$ and cache controllers $12_1, 12_2 \ldots 12_n$ respectively associated with the processors $4_1, 4_2 \ldots 4_n$. A conventional memory controller 14 is associated with the memory 8.

The computer system 2 may represent any of several different types of computing apparatus. Such computing apparatus may include, but are not limited to, general purpose computers, special purpose computers, portable computing devices, communication and/or media player devices, set-top devices, embedded systems, and other types of information handling machines. The term "processor" as used with reference to the processors $4_1, 4_2 \ldots 4_n$ encompasses any program execution unit capable of executing program instructions, including but not limited to a packaged integrated circuit device (such as a microprocessor), a processing core within a packaged integrated circuit device (such as a microprocessor core), or a hardware thread comprising one or more functional units within a processing core (such as an SMT thread). Each such execution unit may be referred to as a CPU (central processing unit). The processors $4_1, 4_2 \ldots 4_n$ may be situated within a single computing device or node (e.g., as part of a single-node SMP system) or they may be distributed over plural nodes (e.g., as part of a NUMA system, a cluster, or a cloud). The memory 8 may comprise any type of tangible storage medium capable of storing data in computer readable form for use in program execution, including but not limited to, any of various types of random access memory (RAM), various flavors of programmable read-only memory (PROM) (such as flash memory), and other types of primary storage (i.e., program memory). The cache memories $10_1, 10_2 \ldots 10_n$ may be implemented in several levels (e.g., as level 1, level 2 and level 3 caches) and the cache controllers $12_1, 12_2 \ldots 12_n$ may collectively represent the cache controller logic that supports each cache level. As illustrated, the memory controller 14 may reside separately from processors $4_1, 4_2 \ldots 4_n$, for example, as part of a discrete chipset. Alternatively, the memory controller 114 could be provided by plural memory controller instances that are respectively integrated with the processors $4_1, 4_2 \ldots 4_n$.

Each CPU embodied by a given processor 4 is operable to execute program instruction logic under the control of a software program stored in the memory 8 (or elsewhere). As part of this program execution logic, update operations (updaters) 18 may execute within a process, thread, or other execution context (hereinafter "task") on any of the processors 4. Each updater 18 runs periodically to perform updates on a set of shared data 16 that may be stored in the shared memory 8 (or elsewhere). In FIG. 4, reference numerals $18_1, 18_2 \ldots 18_n$ illustrate individual data updaters that respectively execute on the several processors $4_1, 4_2 \ldots 4_n$. As described in the "Background" section above, the updates performed by an RCU updater can include modifying elements of a linked list, inserting new elements into the list, deleting elements from the list, and other types of operations. To facilitate such updates, the processors 4 are programmed from instructions stored in the memory 8 (or elsewhere) to implement a read-copy update (RCU) subsystem 20 as part of their processor functions. In FIG. 4, reference numbers $20_1, 20_2 \ldots 20_n$ represent individual RCU instances that may periodically execute on the several processors $4_1, 4_2 \ldots 4_n$. Any given processor 4 may also execute a read operation (reader) 21. Each reader 21 runs from program instructions stored in the memory 8 (or elsewhere) in order to periodically perform read operations on the set of shared data 16 stored in the shared memory 8 (or elsewhere). In FIG. 4, reference numerals $21_1, 21_2 \ldots 21_n$ illustrate individual reader instances that may respectively execute on the several processors $4_1, 4_2 \ldots 4_n$. Such read operations will typically be performed far more often than updates, this being one of the premises underlying the use of read-copy update. Moreover, it is possible for several of the readers 21 to maintain simultaneous references to one of the shared data elements 16 while an updater 18 updates the same data element.

During operation of the computer system 2, an updater 18 will occasionally perform an update to one of the shared data elements 16. In accordance the philosophy of RCU, a first-phase update is performed in a manner that temporarily preserves a pre-update view of the shared data element for the benefit of readers 21 that may be concurrently referencing the shared data element during the update operation. Following the first-phase update, the updater 18 may register a callback with the RCU subsystem 20 for the deferred destruction of the pre-update view following a grace period (second-phase update). As described in the "Background" section above, this is known as asynchronous grace period processing. Alternatively, the updater 18 may request a synchronous expedited grace period.

The grace period processing performed by the RCU subsystem 20 entails starting new grace periods and detecting the end of old grace periods so that the RCU subsystem 20 knows when it is safe to free stale data (or take other actions). Grace period processing may further entail the management of callback lists that accumulate callbacks until they are ripe for batch processing at the end of a given grace period. In addition, reader priority boosting may be performed on behalf of readers 21 that are blocking the end of a grace period. The foregoing grace period processing operations may be performed by periodically running RCU subsystem instances $20_1, 20_2 \ldots 20_n$ on the several processors $4_1, 4_2 \ldots 4_n$.

Figure 5:
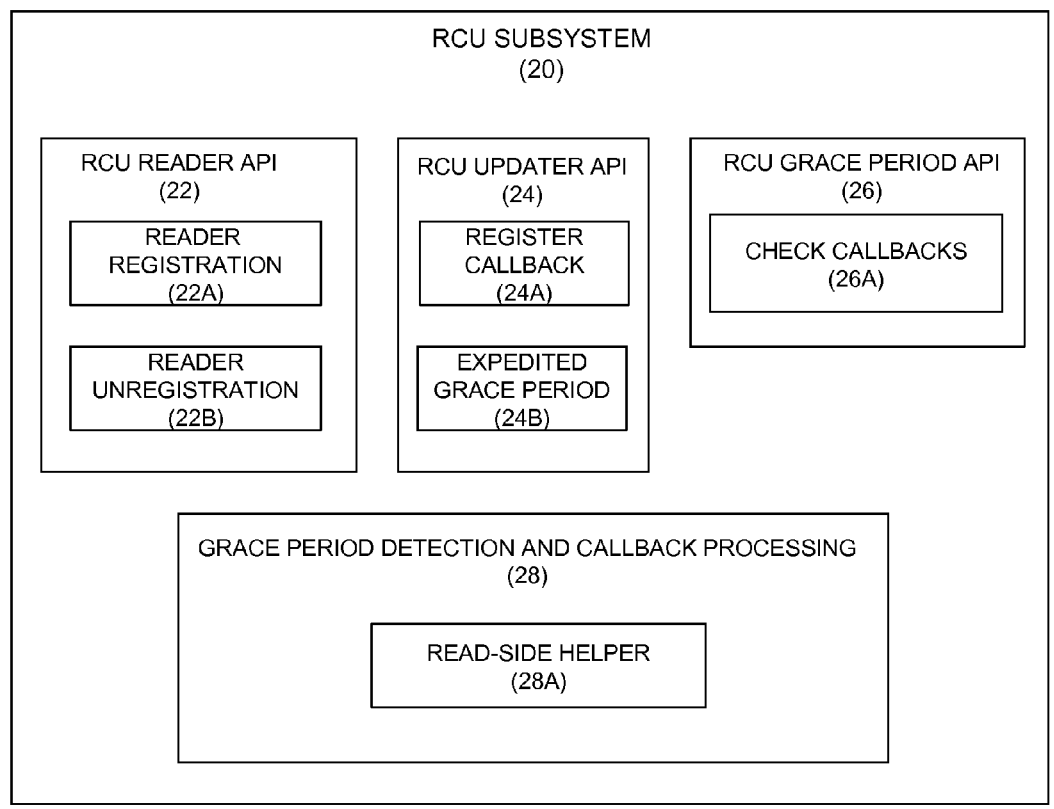
FIG. 5 is a functional block diagram showing an RCU subsystem that may be provided in the computer system of FIG. 4.
Figure 6:
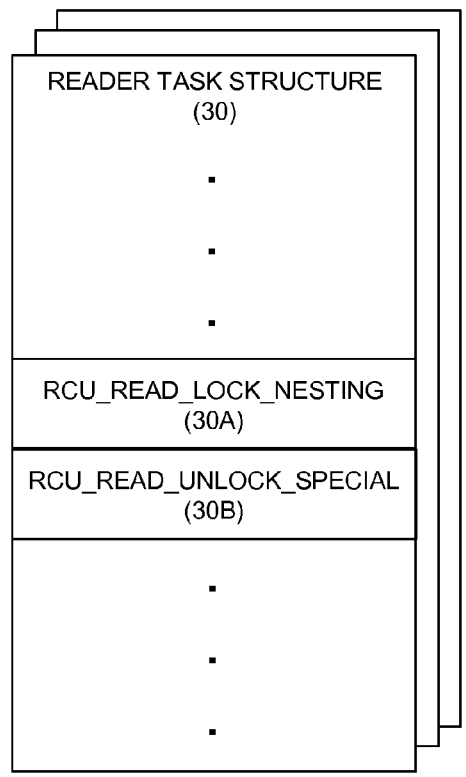
FIG. 6 is a diagrammatic illustration of showing a set of reader task structures comprising fields used by the RCU subsystem.

Turning now to FIG. 5, example components of the RCU subsystem 20 are shown. These components include an RCU reader API (Application Programming Interface) 22, an RCU updater API 24, an RCU grace period API 26, and a set of grace period detection and callback processing functions 28. As shown in FIG. 6, the RCU subsystem 20 also uses several fields in the task structure 30 of each reader 21. As discussed in more detail below, these fields include an rcu_read_lock_nesting counter 30A and an rcu_read_unlock_special flag (30B).

The RCU reader API 22 comprises a reader registration component 22A and a reader unregistration component 22B. These components are respectively invoked by readers 21 as they enter and leave their RCU read-side critical sections, thereby allowing the RCU subsystem 20 to track reader operations and determine when readers are engaged in RCU-protected read-side critical section processing. In an example embodiment, the reader registration component 22A and the reader unregistration component 22B may be respectively implemented using the rcu_read_lock( ) and rcu_read_unlock( ) primitives found in existing read-copy update implementations, but with the rcu_read_unlock( ) primitive being modified to address the deadlock problem discussed in the "Background" section above.

When a reader 21 enters an RCU read-side critical section and invokes the reader registration component 22A, the latter increments the rcu_read_lock_nesting counter 30A (see FIG. 6) in the reader's task structure. When the reader 21 leaves an RCU read-side critical section and invokes the reader unregistration component 22B, the latter decrements the rcu_read_lock_nesting counter 30A. The term "nesting" as used in the name of this counter refers to the fact that a given reader's RCU read-side critical sections can be nested or overlapping. In conventional implementations of the rcu_read_unlock( ) primitive, a counter value of zero is commonly used to indicate that a reader 21 is not performing any RCU read-side critical section processing. This counter value also triggers the conventional rcu_read_unlock( ) primitive to check whether special read-side helper processing (see below) is needed. As described in more detail below, a modified version of the rcu_read_unlock( ) primitive may be used to bypass this test for scheduler-based invocations of the RCU subsystem 20.

The RCU updater API 24 may comprise a register callback component 24A and an expedited grace period component 24B. The register callback component is used by the updaters 18 to register a callback following a first-phase update to a shared data element 16. In an example embodiment, this component may be implemented using the "call rcu( )" primitive found in existing read-copy update implementations. A call to the register callback component 24A initiates processing that places the callback on an RCU callback list (not shown) associated with the processor 4 that runs the updater 18. This starts an asynchronous grace period so that the callback can be processed after the grace period has ended as part of second-phase update processing to remove stale data (or take other actions). The expedited grace period component 24B is used by the updaters 18 to request a synchronous expedited grace period following a first-phase update to a shared data element 16. The updater 18 blocks while the expedited grace period is in progress, then performs second-phase update processing to free stale data (or take other actions). In an example embodiment, this component may be implemented using the "synchronize_rcu_expedited( )" primitive found in existing read-copy update implementations.

The RCU grace period API 26 may comprise a check callbacks component 26A. This component may be run periodically (e.g., in response to a scheduler clock interrupt) in order to check for new callbacks, start a new grace period if one is needed, and request callback processing. In an example embodiment, this component may be implemented using the "rcu_preempt_check_callbacks( )" primitive found in existing read-copy update implementations. As discussed below, the check callbacks component 26A also manipulates the rcu_read_unlock_special flag 30B (see FIG. 6) if necessary to advance a grace period.

The grace period detection and callback processing functions 28 may comprise various components conventionally found in existing read-copy update implementations, including but not limited to a quiescent state/grace period tracking component, a callback processor, a blocked reader handler, and a reader priority boosting component. Of particular relevance to the present disclosure is a read-side helper component 28A that is implemented when a reader 21 is delaying the end of a grace period. In an example embodiment, this component may be implemented using the "rcu_read_unlock_special( )" primitive found in existing read-copy update implementations. Its operations may include advising the RCU subsystem 20 that a delayed reader 21 is exiting an RCU read-side critical section (and that a quiescent state has been reached if this is the last reader), removing the reader from one or more blocked task lists used to identify readers that are blocking the end of a grace period, and invoking the scheduler to unboost the reader's priority if it was previously boosted.

Figure 7:
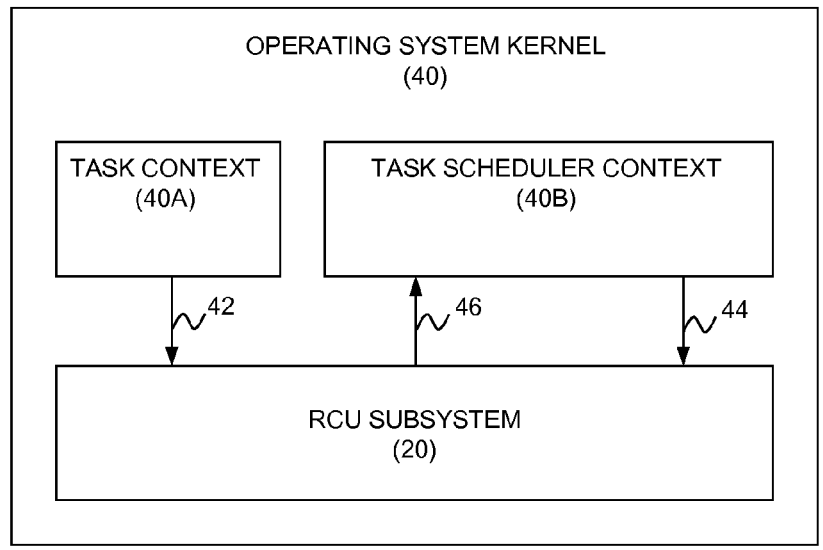
FIG. 7 is a block diagram showing an operating system kernel in which the RCU subsystem may be invoked by task-context RCU readers and task scheduler-context RCU readers, and may itself invoke the scheduler.

As described in the "Background" section above, the present disclosure describes a technique that addresses the problem of deadlock that may occur in modern operating systems whose schedulers make increasing use of RCU and wherein RCU makes increasing calls to the scheduler. Current versions of the Linux® kernel configured for kernel-level preemption are one example. As shown in FIG. 7, a preemptible operating system kernel 40 that implements the RCU subsystem 20 may operate in task context 40A (e.g., due to a system call) and scheduler context 40B (also referred to herein as "the scheduler"). The RCU subsystem 20 can be invoked from both task context 40A and scheduler context 40B in the event that either context needs to perform RCU read-side critical section processing as an RCU reader 21. These respective invocations of the RCU subsystem 20 are shown by the arrows 42 and 44, each of which represents a pair of calls to the reader registration component 22A (e.g., rcu_read_lock( )) and the reader unregistration component 22B (e.g., rcu_read_unlock( )) of FIG. 5. In addition, an RCU reader 21 operating in task context 40A can invoke the scheduler 40B from the reader unregistration component 22B (e.g., rcu_read_unlock( )) via the read-side helper component 28A of FIG. 5 (e.g., rcu_read_unlock_special( )). This is shown by the arrow 46. For example, the read-side helper component 28A may need to deboost the current task (when RCU priority boosting is enabled) or to wake up the task if it requested an expedited RCU grace period and it is the last such task that was blocking the end of that grace period.

In current implementations of the Linux® kernel, the rcu_read_unlock( ) function that provides the reader unregistration component 22B invokes a work function known as rcu_ read_unlock( ). The rcu_read_unlock( ) function, in turn, conditionally invokes the rcu_read_unlock_special( ) function that provides the read-side helper component 28A. The conditions that lead to the invocation of rcu_read_unlock_special( ) are determined from the two fields 30A and 30B in the reader's task structure 30 (see FIG. 6). As previously stated, the first field 30A is an rcu_read_lock_nesting counter that maintains a count of the number of times the reader 21 has recursively entered an RCU read-side critical section. In a conventional RCU implementation a counter value of zero signifies that the reader 21 is not within such a critical section. The second field 30B is the rcu_read_unlock_special flag that is set by the check callbacks component (26A) of FIG. 5. In current implementations of the Linux® kernel, the rcu_read_unlock_special( ) function that provides the read-side helper component 28A is invoked when (1) the rcu_read_lock_nesting counter 30A is zero (indicating that the reader 21 has completed all RCU read-side critical section processing) and (2) the rcu_read_unlock_special flag 30B is set (indicating that additional actions are required on behalf of this reader).

Example C language source code for a conventional rcu_read_unlock( ) work function that performs the foregoing condition processing is shown in FIG. 8. Line 6 decrements and tests the rcu_read_lock_nesting counter 30A for zero. If true, and following a memory ordering barrier( ) compiler directive in line 7, a check is made in line 8 to determine the state of the rcu_read_unlock_special flag 30B. If the rcu_read_unlock_special flag 30B is set, the rcu_read_unlock_special( ) function is invoked in line 9.

The operations performed by the rcu_read_unlock_special( ) function that provides the read-side helper component 28A will not be described in detail, but, as mentioned above, may include deboosting the current task (when RCU priority boosting is enabled) or waking up the task that requested an expedited RCU grace period (when the current task is the last one executing). Referring back to FIG. 7, these operations can result in the RCU subsystem 20 invoking the task scheduler 40B (see arrow 46) to acquire its runqueue locks and its priority inheritance locks. If the scheduler 40B independently invokes rcu_read_unlock( ) while holding the runqueue and priority-inheritance locks, and if that invocation of rcu_read_unlock( ) reinvokes the scheduler in the same manner as the initial rcu_read_unlock( ) operation, there is the possibility of deadlock under certain scenarios.

Such scenarios can be avoided if the scheduler 40B disables interrupts when acquiring its runqueue and priority-inheritance locks. As long as the scheduler's RCU read-side critical sections are completely contained in a given runqueue or priority-inheritance lock's critical section, then that RCU read-side critical section cannot be interrupted, blocked, or preempted. There can therefore be no reason for rcu_read_unlock( ) to reinvoke the scheduler. In particular, there can be no priority boosting during the scheduler's RCU read-side critical because there can be no preemption with interrupts disabled. Moreover, the scheduler's RCU read-side critical section cannot be the last RCU read-side critical section to end for an expedited grace period because interrupts are disabled and there can be no preemption by reschedule IPIs (interprocessor interrupts).

However, consider an implementation of rcu_read_unlock( ) in a hierarchical RCU implementation designed for systems with many processors. In current versions of the Linux® kernel, the hierarchical RCU kernel configuration option is known as CONFIG_TREE_PREEMPT_RCU. In this implementation it is possible for the following sequence of events to occur:

1. Task 0 invokes rcu_read_lock( ), entering an RCU read-side critical section.
2. Task 0 is preempted, during which time it is subjected to priority boosting, which causes it to run again.
3. Task 0 completes its RCU read-side critical section, and therefore invokes the work function rcu_read_unlock( ) through line 7 of FIG. 8, decrementing the ->rcu_read_lock_nesting nesting count and finding the result to be zero.
4. The CPU on which Task 0 is running is interrupted, and the interrupt handler invokes the scheduler 40B to wake up another task to run, causing the scheduler to acquire a runqueue lock and to enter an RCU read-side critical section.
5. When the interrupt handler exits its RCU read-side critical section, the interrupt handler will invoke rcu_read_unlock( ). During this second invocation of _rcu_read_unlock( ), the interrupt handler might find the value of Task 0's per-task->rcu_read_unlock_special field (see line 8 of FIG. 8) to be non-zero (e.g., due to Task 0 having been previously preempted within its RCU read-side critical section). The interrupt handler would therefore invoke the rcu_read_unlock_special( ) function to perform special processing. As previously discussed, this function may invoke the scheduler 40B to attempt to unboost Task 0, which would require the scheduler to attempt to acquire the runqueue lock that it already holds, resulting in deadlock.

The problem in this situation is that the interrupt handler's RCU reader code path is nested within the task-level RCU reader's code path, and the interrupt handler's instance of the_rcu_read_unlock( ) primitive is seeing the state that is intended for the task-level _rcu_read_unlock( ). A proposed solution to this problem is to use separate first and second rcu_read_lock_nesting manipulation paths in the reader unregistration component 22B that are dependent on different values of the rcu_read_lock_nesting counter 30A (see FIG. 6). The first rcu_read_lock_nesting manipulation path includes condition-based read-side helper processing that may result in invocation of the operating system scheduler 40B. This path is taken when the current value of the rcu_read_lock_nesting counter is indicative of a task-context RCU reader 21 exiting an outermost RCU read-side critical section. It includes a deadlock-protection operation that temporarily manipulates the rcu_read_lock_nesting counter to prevent any intervening RCU reader 21 from taking the first rcu_read_lock_nesting manipulation path while the task-context RCU reader 21 is within that path. The second rcu_read_lock_nesting manipulation path bypasses the condition-based read-side helper processing. This path is taken when the rcu_read_lock_nesting counter is indicative of a task-context RCU reader exiting a non-outermost RCU read-side critical section, or when the current value of the rcu_read_lock_nesting counter is indicative of an RCU reader being nested within the first rcu_read_lock_nesting manipulation path, such as due to an interrupt handler interrupting the path to run the scheduler or an explicit call to the scheduler from within the path.

In an example embodiment, the RCU unregistration component allows an RCU reader to manipulate the rcu_read_lock_nesting counter by either decrementing it or setting it to a value, depending on which manipulation path of the reader unregistration component is taken. In particular, the first manipulation path includes setting the rcu_read_lock_nesting counter to a deadlock-protection value, and the second manipulation path includes decrementing the rcu_read_lock_nesting counter. Still more particularly, the first manipulation path may be taken when the rcu_read_lock_nesting counter has a first count value that is indicative of the task-context RCU reader exiting all RCU read-side critical section processing, and may comprise setting the rcu_read_lock_nesting counter to an arbitrary second count value representing the deadlock-protection value, performing read-side helper processing, and resetting the rcu_read_lock_nesting counter to a third count value that is indicative of the task-context RCU reader being outside of an RCU read-side critical section. The arbitrary second count value may be a large negative number. The second manipulation path of the unregistration component may be taken when the rcu_read_lock_nesting counter has any value other than the first count value, and may comprise decrementing the rcu_read_lock_nesting counter and bypassing the read-side helper processing.

Example C language code implementing this solution is shown in FIG. 9. This has roughly the same overhead as the conventional code of FIG. 8: the decrement and assignment operation of line 6 of FIG. 8 has been replaced by the decrement operation of line 6 of FIG. 9 (for the first rcu_read_lock_nesting manipulation pathway) or the two assignment operations at lines 9 and 15 of FIG. 9 (for the second rcu_read_lock_nesting manipulation pathway). When a task-context reader 21 exits its outermost RCU read-side critical section and reaches line 5 of FIG. 9, it will find that the rcu_read_lock_nesting counter 30A is equal to one. Execution will jump to line 7, a memory-ordering barrier( ) compiler directive provided in line 8, and the rcu_read_lock_nesting counter 30A will be set to INT_MIN, which can be a large negative number, in line 9. This represents the above-mentioned deadlock-protection value. Following another memory ordering barrier( ) compiler directive in line 11, lines 12-13 will be implemented and rcu_read_unlock_special( ) will be invoked if necessary (i.e., according to the state of the rcu_read_unlock_special flag 30B in the reader's task structure (see FIG. 6). Once the invocation of rcu_read_unlock_special( ) by the task-context RCU reader 21 is no longer a possibility, another memory-ordering barrier( ) compiler directive is provided on line 14 and the rcu_read_lock_nesting counter 30A is set to zero on line 15. The foregoing processing represents the first rcu_read_lock_nesting manipulation path mentioned above. This path is taken by task-context readers 21 that are exiting their outermost RCU read-side critical sections.

Advantageously, if a nested scheduler-level RCU reader 21 is invoked while the task-context RCU reader 21 is within the first rcu_read_lock_nesting manipulation path, the scheduler-level RCU reader, upon reaching line 5 of FIG. 9, will find that the rcu_read_lock_nesting counter 30A is not equal to 1. The rcu_read_lock_nesting counter 30A will equal INT_MIN+1 due to the scheduler-level RCU reader 21 having previously invoked the reader registration component 22A (which increments the rcu_read_lock_nesting counter). Line 6 will then decrement the rcu_read_lock_nesting counter 30A (setting it to INT_MIN) but the code path of lines 7-15 that leads to rcu_read_unlock_special( ) and the deadlock problem described above, will be bypassed. The foregoing processing represents the second rcu_read_lock_nesting manipulation path mentioned above. This path is taken by any RCU reader that is nested within the first rcu_read_lock_nesting manipulation path. As previously mentioned, this could be an interrupt handler that interrupts the first path or an explicit call to the scheduler 40B from within that path. This first rcu_read_lock_nesting manipulation path is also taken by task-context readers 21 that are not exiting an outermost RCU read-side critical section.

Figure 10:
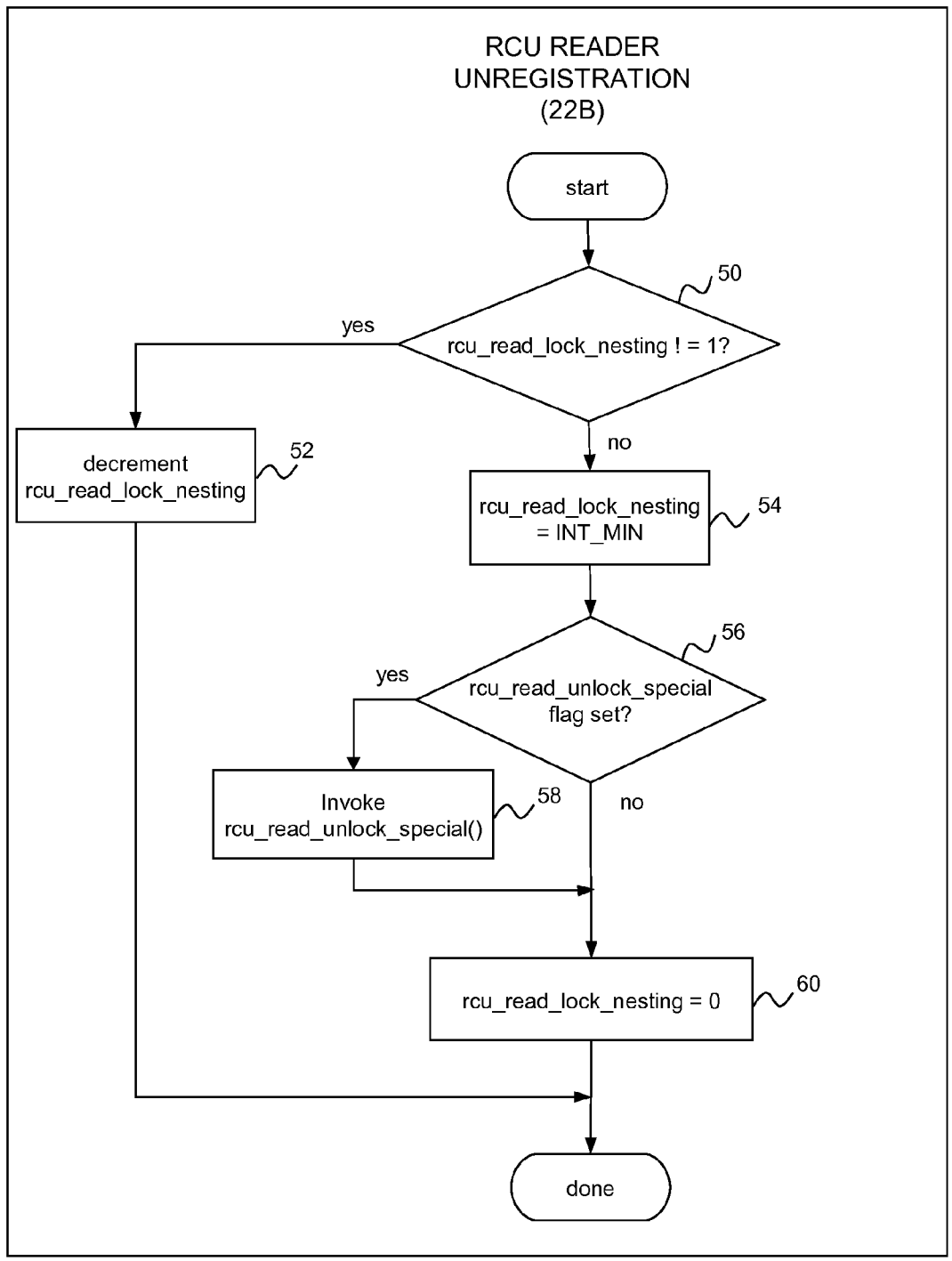
FIG. 10 is a flow diagram corresponding to FIG. 9.

The flow diagram of FIG. 10 illustrates the foregoing processing. In block 50, the test represented by line 5 of FIG. 9 is implemented. Block 52 represents the decrement of line 6 of FIG. 9 and block 54 represents the assignment of line 9 of FIG. 9. In block 56, the condition test represented by line 12 of FIG. 9 is implemented. Block 58 represents the conditional invocation of rcu_read_unlock_special( ) set forth on line 13 of FIG. 9. Block 60 represents the operation of line 15 of FIG. 9 in which the rcu_read_lock_nesting counter is set to zero.

Accordingly, a technique for has been disclosed for implementing read-copy update in a manner that resolves RCU-scheduler deadlocks in an operating system kernel. It will be appreciated that the foregoing concepts may be variously embodied in any of a data processing system, a machine implemented method, and a computer program product in which programming logic is provided by one or more machine-useable storage media for use in controlling a data processing system to perform the required functions. Example embodiments of a data processing system and machine implemented method were previously described in connection with FIG. 4-10. With respect to a computer program product, digitally encoded program instructions may be stored on one or more computer-readable data storage media for use in controlling a computer or other digital machine or device to perform the required functions. The program instructions may be embodied as machine language code that is ready for loading and execution by the machine apparatus, or the program instructions may comprise a higher level language that can be assembled, compiled or interpreted into machine language. Example languages include, but are not limited to C, C++, assembly, to name but a few. When implemented on a machine comprising a processor, the program instructions combine with the processor to provide a particular machine that operates analogously to specific logic circuits, which themselves could be used to implement the disclosed subject matter.

Figure 11:
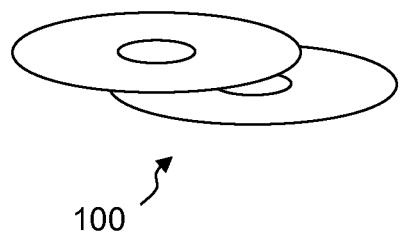
FIG. 11 is a diagrammatic illustration showing example storage media that may be used to provide a computer program product in accordance with the present disclosure.

Example data storage media for storing such program instructions are shown by reference numerals 8 (memory) and 10 (cache) of the multiprocessor system 2 of FIG. 4. The system 2 may further include one or more secondary (or tertiary) storage devices (not shown) that could store the program instructions between system reboots. A further example of storage media that may be used to store the program instructions is shown by reference numeral 100 in FIG. 11. The storage media 100 are illustrated as being portable optical storage disks of the type that are conventionally used for commercial software sales, such as compact disk-read only memory (CD-ROM) disks, compact disk-read/write (CD-R/W) disks, and digital versatile disks (DVDs). Such storage media can store the program instructions either alone or in conjunction with an operating system or other software product that incorporates the required functionality. The storage media could also be provided by other portable storage media (such as floppy disks, flash memory sticks, etc.), or storage media combined with drive systems (e.g. disk drives). As is the case with the memory 8 and the cache 10 of FIG. 4, the storage media may be incorporated in data processing platforms that have integrated random access memory (RAM), read-only memory (ROM) or other semiconductor or solid state memory. More broadly, the storage media could comprise any electronic, magnetic, optical, infrared, semiconductor system or apparatus or device, or any other tangible entity representing a machine, manufacture or composition of matter that can contain, store, communicate, or transport the program instructions for use by or in connection with an instruction execution system, apparatus or device, such as a computer. For all of the above forms of storage media, when the program instructions are loaded into and executed by an instruction execution system, apparatus or device, the resultant programmed system, apparatus or device becomes a particular machine for practicing embodiments of the method(s) and system(s) described herein.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. In a computer system having one or more processors operatively coupled to one or more memory devices and implementing a read-copy update (RCU) subsystem, a method for resolving deadlocks between said RCU subsystem and an operating system scheduler, comprising:
   providing an RCU registration component that allows an RCU reader to manipulate an rcu_read_lock_nesting counter when said RCU reader enters an RCU read-side critical section;
   providing an RCU unregistration component that allows an RCU reader to manipulate said rcu_read_lock_nesting counter when said RCU reader leaves an RCU read-side critical section;
   said unregistration component providing first and second rcu_read_lock_nesting manipulation paths that are dependent on a current value of said rcu_read_lock_nesting counter;
   said first rcu_read_lock_nesting manipulation path being taken when said current value of said rcu_read_lock_nesting counter is indicative of a task-context RCU reader exiting an outermost RCU read-side critical section;
   said first rcu_read_lock_nesting manipulation path including condition-based read-side helper processing that may result in invocation of said operating system scheduler;
   said first rcu_read_lock_nesting manipulation path further including a deadlock protection operation that temporarily manipulates said rcu_read_lock_nesting counter to prevent any intervening RCU reader from taking said first rcu_read_lock_nesting manipulation path while a task-context RCU reader is within that path;
   said second rcu_read_lock_nesting manipulation path being taken when said current value of said rcu_read_lock_nesting counter is indicative of a task-context RCU reader exiting a non-outermost RCU read-side critical section or an RCU reader being nested within said first rcu_read_lock_nesting manipulation path;
   said second rcu_read_lock_nesting manipulation path bypassing said condition-based read-side helper processing
   said RCU unregistration component allowing an RCU reader to manipulate said rcu_read_lock_nesting counter by either decrementing it or setting it to a value, depending on which manipulation path is taken by said RCU reader; and
   said first manipulation path comprising setting said rcu_read_lock_nesting counter to a deadlock protection value and said second manipulation path comprises decrementing said rcu_read_lock_nesting counter.

2. The method of claim 1, wherein said RCU registration component allows an RCU reader to manipulate said rcu_read_lock_nesting counter by incrementing it.

3. The method of claim 1, wherein said first manipulation path is taken when said rcu_read_lock_nesting counter has a first count value that is indicative of said task-context RCU reader exiting all RCU read-side critical section processing, and comprises setting said rcu_read_lock_nesting counter to an arbitrary second count value representing said deadlock protection value, performing said read-side helper processing, and setting said rcu_read_lock_nesting counter to a third count value that is indicative of said task-context RCU reader being outside of an RCU read-side critical section.

4. The method of claim 3, wherein said arbitrary second count value is a large negative number.

5. The method of claim 3, wherein said second manipulation path is taken when said rcu_read_lock_nesting counter has any value other than said first count value, and comprises decrementing said rcu_read_lock_nesting counter and bypassing said read-side helper processing.

* * * * *